United States Patent

[11] 3,604,104

[72] Inventor Paul H. Glasgow
 1159 W. Maumee St., Adrian, Mich. 49221
[21] Appl. No. 802,433
[22] Filed Feb. 26, 1969
[45] Patented Sept. 14, 1971

[54] METHOD OF PRODUCING ALUMINUM BRAZED COIL
 4 Claims, 5 Drawing Figs.
[52] U.S. Cl. .................................................... 29/487,
 29/495, 29/497, 29/498, 148/24, 148/26, 148/28
[51] Int. Cl. ........................................................ B23k 31/02
[50] Field of Search ............................................. 29/497,
 495, 498, 487; 148/24, 26, 28; 75/94

[56] References Cited
UNITED STATES PATENTS

| | | | |
|---|---|---|---|
| 2,723,449 | 11/1955 | Miller............................ | 29/495 X |
| 2,844,867 | 7/1958 | Wernz........................... | 29/497 X |
| 2,959,844 | 11/1960 | Selke............................. | 29/497 X |
| 3,108,369 | 10/1963 | Koeplinger.................... | 29/498 X |
| 3,373,483 | 3/1968 | Miller............................ | 29/504 X |
| 3,386,152 | 6/1968 | Plegat........................... | 29/495 X |
| 3,456,331 | 7/1969 | Holden.......................... | 29/497 X |

OTHER REFERENCES
Brazing Manual, Published by American Welding Society, copyright 1963, pp. 130–139

Welding Handbook, Section 4, 5th Edition, published 1966, pp. 69.116– 69.120.

*Primary Examiner*—John F. Campbell
*Assistant Examiner*—Ronald J. Shore
*Attorney*—Whittemore, Hulbert & Belknap ABSTRACT: A method of producing an all-aluminum coil is disclosed. In accordance with the method disclosed, hairpin coil tubes and coil fins are assembled with headers, return bends and inlet and outlet tubes. The ends of the hairpin tubes are expanded to receive the return tube portions with a predetermined clearance and the tubes are loaded with a solder ring at the expanded ends thereof. The fins are provided with solder-clad spacing collars around openings therethrough through which the hairpin tubes extend. The hairpin tubes are then expanded to mechanically secure the fin collars to the hairpin tubes. The assembled coil is then placed in a preheat oven and preheated to approximately 1,000°F. to bring the solder to a buttery consistency, after which the preheated coil assembly is immersed in molten Barium chloride salt at approximately 1,100°F. so that the solder rings and cladding on the collars braze the tubes and fins together. The brazed coil assembly is then washed in a hot ammonia bath. Sodium fluoride and lithium chloride fluxes are added to the salt bath to prevent oxidation of the coil components and to control the melting point of the salt bath, respectively.

PATENTED SEP 14 1971　　　3,604,104
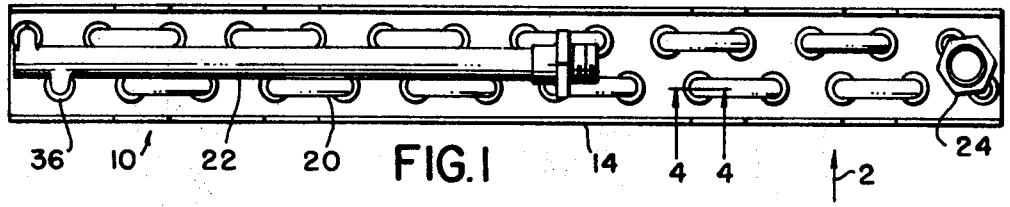
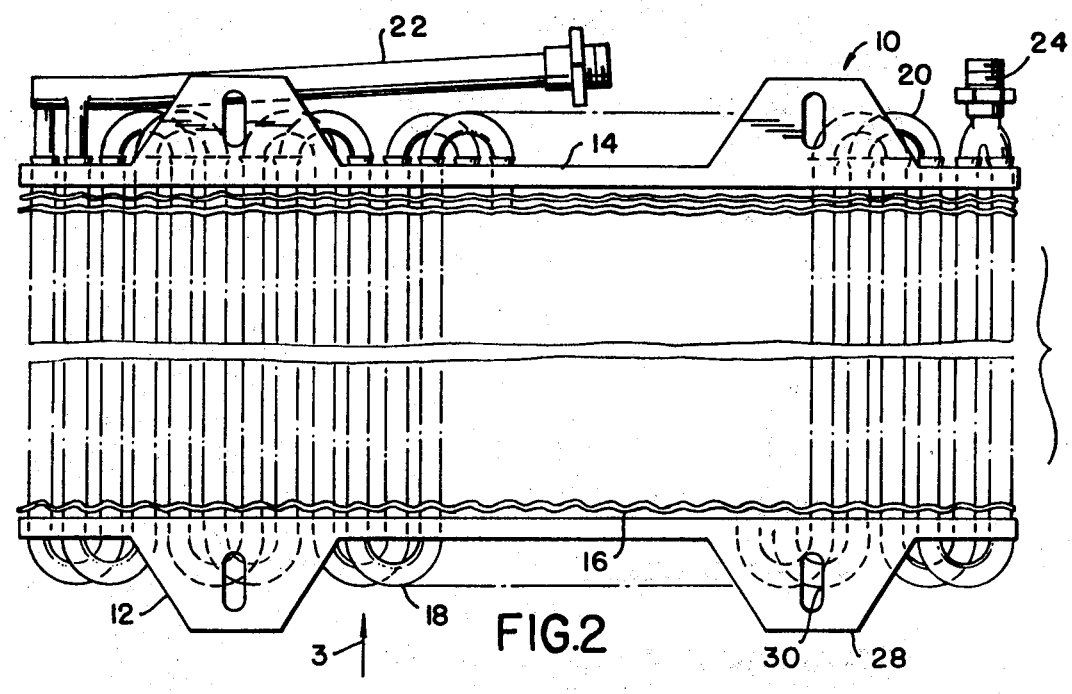
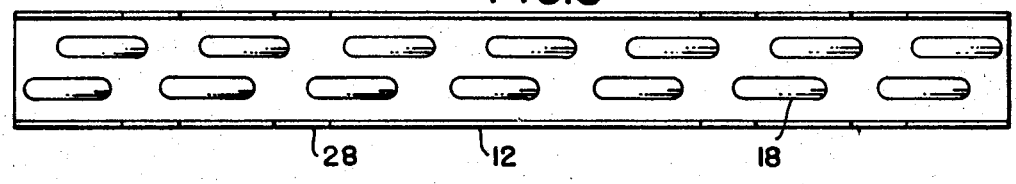
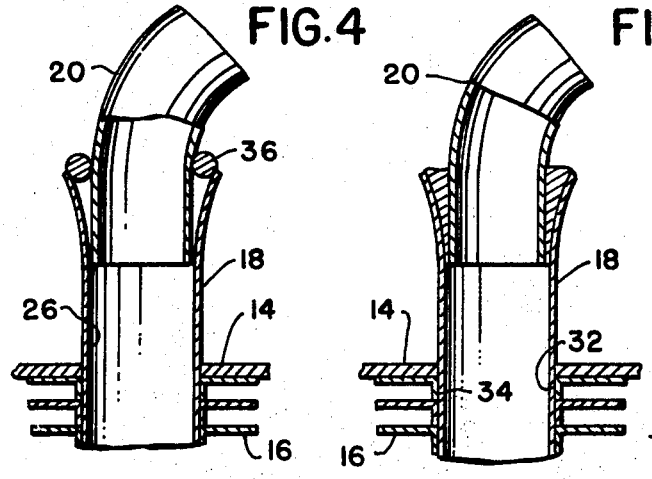
INVENTOR.
PAUL H. GLASGOW
BY Whittemore
Hulbert & Belknap
ATTORNEYS 3,604,104

METHOD OF PRODUCING ALUMINUM BRAZED COIL

BACKGROUND OF THE INVENTION

1. Field of the Invention

The invention relates to coils such as heat exchange coils used in cooling systems and the like and refers more specifically to an all-aluminum dip-brazed coil and the method of producing the coil comprising loading and cladding the assembled coil with aluminum solder, preheating the assembled coil to place the cladding and solder in a buttery condition, dipping the assembled coil in a salt bath to solder the components thereof together and subsequently washing the coil in an ammonia bath.

2. Description of the Prior Art

In the past, coils have been produced of copper, hairpin tubes extended through headers and fins and expanded to secure the fins to the tubes after which return tubes have been placed in the open ends of the hairpin tubes and brazed in place. The coil inlet and outlet tubes have then usually been hand brazed to the coil core. With such production procedures a large percentage of leaking coils have been produced due to oxidation taking place during brazing. In addition, the hand brazing of the past is relatively time consuming and therefore expensive. Furthermore, the coils of the past have generally been copper and therefore heavier than desirable.

The efficiency of the coils produced by the above method has also been less than desirable. Thus, for example, the heat transfer between the expanded tubes and the fins has been less than desirable because of the purely mechanical connection therebetween. Further, after a few cycles of contraction and expansion due to heating and cooling of the coils, the fins of the coils of the past have usually become loose thereby losing a large percent of their initial heat transferring ability.

SUMMARY OF THE INVENTION

In accordance with the invention an all-aluminum dip-brazed coil is produced by the method of first cladding the coil fins to provide a solder coating on the collars thereof, assembling the fins and headers of the coil on hairpin tubes expanding the tubes, placing return tubes, inlet and outlet tubes in the open ends of the hairpin tubes, loading the connection between the hairpin tubes and the other tubes with aluminum solder rings, preheating the assembled coil structure to approximately 1,000°F. to bring the solder up to a buttery condition and subsequently dipping the preheated coil assembly in a molten salt bath to braze the fin collars to the tubes and to seal the connection between the expanded tube ends and the other tubes. Sodium fluoride and lithium chloride fluxes are added to the barium chloride bath to control oxidation and freezing point of the bath, respectively. Subsequently the assembled and brazed coil is washed in a hot ammonia bath.

The coil structure thus produced includes a complete brazed connection between the expanded tube ends and the other tubes and a full brazed connection for each fin collar to the associated tube whereby a minimum of leaking coils is produced and a maximum of heat transfer between material in the coil and the fins is permitted over extended coil use.

BRIEF DESCRIPTION OF THE DRAWINGS

FIG. 1 is a top view of an all-aluminum dip-brazed coil constructed according to the invention by the method of the invention.

FIG. 2 is a broken elevation view of the coil structure of FIG. 1 taken in the direction of arrow 2 in FIG. 1.

FIG. 3 is a bottom view of the coil structure of FIGS. 1 and 2 taken in the direction of arrow 3 in FIG. 2.

FIGS. 4 and 5 are enlarged partial section views of the coil structure illustrated in FIGS. 1 through 3 taken substantially on the line 4—4 in FIG. 1 and illustrating the brazed connections between the expanded ends of the hairpin tubes and the return tubes and the fin collars before and after dipping the coil structure in a molten salt bath, respectively.

DESCRIPTION OF THE PREFERRED EMBODIMENTS

The all-aluminum coil 10 illustrated best in FIG. 2 includes a lower header 12 and an upper header 14 spaced apart by means of cooling fins 16. The headers 12 and 14 and cooling fins 16 are held together by the hairpin tubes 18 and return bend tubes 20. Inlet and outlet tubes 22 and 24 are secured to the hairpin tubes 18 at the opposite sides of the coil 10 as shown.

The all-aluminum coil 10 is produced by assembling the separate coil members loaded or clad with solder, preheating the assembled coil members, dipping them in molten salt and subsequently washing them in an ammonia solution.

More specifically, the headers 14 and 16 as shown are generally U-shaped members having openings 26 extending therethrough for receiving the hairpin tubes 18. Flanges 28 are provided on the headers 14 and 16 with openings 30 therein for mounting the finished coil.

The cooling fins 16 are aluminum coil stock of 0.006 inch or 0.007 inch-thick clad on two sides with 0.0004 inch to 0.0006 inch of aluminum solder. The fins are punched to provide openings 32 therethrough surrounded by collars 34 having the solder cladding thereon. The fins 16 may be corrugated in a desired configuration, as illustrated generally in FIG. 2, and in assembly are held in place by the hairpin tubes 18 at a spacing determined by the extent of the collars 34 axially of the hairpin tubes 18.

The hairpin tubes 18 are aluminum having a three-eighth inch or a one-half inch outside diameter with an extruded wall thickness of approximately 0.33 inch. The tubes 18 are bent into a hairpin shape for the desired coil height and are assembled by passing the hairpin tubes through the openings 26 in the headers 12 and 14 and through the openings 32 in the fins 16. The tubes 18 are then expanded in the manufacture of the coil 10 to firmly grip the headers and fins. The open ends of the tubes are flared one-half inch deep and have a clearance of between 0.004 inch and 0.005 inch per side when the return tubes 20 are inserted therein, as shown in FIGS. 4 and 5.

The return tubes 20 are made of the same aluminum 3003 ASTM alloy that the tubes 18 and fins 16 are made of and are of substantially the same diameter as the hairpin tubes 18. In the manufacture of the coil 10 each end of the return tubes 20 are loaded with a three thirty-seconds inch diameter aluminum solder ring fitting snugly over the ends of the return bend tubes and over the expanded open ends of the hairpin tubes 18. Similar joints are provided between the inlet tube 22 and outlet tube 24 and the hairpin tubes 18, as shown best in FIG. 2.

The aluminum solder of the rings 36 is substantially the same composition as that of the cladding of the fins 16. The solder includes 13 percent to 15 percent silicon, 0.25 percent copper, 0.70 percent iron, 0.25 percent zinc, 0.10 percent magnesium, and 0.15 percent manganese by weight. The balance of the solder is aluminum.

In the manufacture of the coil 10 the assembled coil members loaded and clad with aluminum solder are first placed in a preheat oven and brought up to a temperature of 1,000 °F. The solder becomes buttery at this temperature. The coil is then removed from the preheat oven and immediately immersed in a barium chloride bath which is maintained at approximately 1,100°F. plus or minus 5°. While the assembled coil 10 is in the salt bath the fins are brazed at their collars to the hairpin tubes 18 and the return tubes 20 are brazed to the hairpin tubes 18.

As shown in FIGS. 4 and 5, in the salt bath the solder rings 36 melt and are drawn into the small opening between the open ends of the hairpin tubes 18 and the ends of the return tubes 20, by capillary action to provide a solid brazed connection therebetween. The collars 32 are also firmly brazed to the hairpin tubes 18 due to the heat of the salt bath.

While it is not necessary to flux the coil assembly before the preheat or salt dip operations, sodium fluoride flux is added to the salt bath to prevent oxidation of the coil 10. Observation of the coil in the salt bath may be used to determine the amount of sodium fluoride to be added to the barium chloride to prevent a black appearance of the coil 10 which signifies oxidation thereof. Also, a lithium chloride flux is added to the barium chloride to control the melting point of the barium chloride bath and is added until the crust which appears when the sodium chloride tends to solidify at the sides of the bath disappears.

After dipping the coil 10 in the salt bath the coil is removed from the salt bath and immersed in a 5 percent ammonia bath at approximately 200°F. The ammonia bath neutralizes the effects of the fluxes added to the salt bath both inside and outside of the core of the coil 10. At the same time the immersion in the ammonia bath will wash off any salt that may remain on or inside the core.

The brazed and washed coil then may be blown out and blown off with normal air pressure and the coil tested under water at, for example 350 pounds. If necessary to repair the coil an aluminum solder having the composition above indicated may be used.

The coil thus produced will be all aluminum and therefore considerably lighter than the normal copper coil. In addition the coil thus produced will have a complete brazed connection between the open ends of the hairpin tubes and the return tubes and the fins will be separately brazed to the hairpin tubes to provide maximum heat transfer for a maximum period. In addition, fewer reject coils are produced since oxidation of the tubes during brazing is substantially eliminated and hand brazing of the components of the coil is eliminated.

What I claim as my invention is:

1. A method of producing an aluminum coil comprising assembling coil components with aluminum alloy solder, preheating the assembled coil to approximately 1,000°F. to bring the solder to a buttery state, dipping the preheated assembled coil in a molten salt bath comprising as its major component barium chloride and also including sodium fluoride and lithium chloride flux maintained at approximately 1,100° F. to braze the coil components together, and removing the brazed coil from the salt bath and immersing the coil in an ammonia bath to neutralize the effects of fluxes thereon.

2. The method as set forth in claim 1, wherein the solder includes 13 percent to 15 percent silicon, 0.25 percent copper, 0.70 percent iron, 0.25 percent zinc, 0.10 percent magnesium, 0.15 percent manganese and the balance aluminum.

3. The method as set forth in claim 1, wherein the ammonium bath is a 5 percent ammonia bath and is maintained at approximately 200°F.

4. A method of producing an aluminum coil structure having headers with openings therethrough, hairpin tubes, fins having openings therethrough with aluminum alloy solder-clad collars therearound, return bend tubes, inlet and outlet tubes, and aluminum alloy solder rings, said solder including approximately 13 percent to 15 percent silicon, 0.25 percent copper, 0.70 percent iron, 0.25 percent zinc, 0.10 percent magnesium, 0.15 percent manganese and the balance aluminum, comprising assembling said coil components by inserting the hairpin tubes through the openings in the headers and through the openings in the fins, expanding the hairpin tubes at the ends thereof to mechanically secure said tubes to the headers and fins, loading each end of the return bend tubes with aluminum alloy solder rings and inserting said return tubes with the solder therearound into the expanded ends of the hairpin tubes so as to have the rings fitting snugly over the ends of the return bend tubes and over the expanded open ends of the hairpin tubes thus connecting the two tubes together, preheating the assembled coil to approximately 1,000 °F. to bring the solder to a buttery state, dipping the preheated assembled coil in a molten salt bath comprising as its major component barium chloride and also including sodium fluoride and lithium chloride flux maintained at approximately 1,100 °F. to braze the coil components together, and removing the brazed coil from the salt bath and immersing the coil in an ammonia bath to neutralize the effects of the fluxes thereon.